(12) United States Patent
Dittrich et al.

(10) Patent No.: US 9,890,812 B2
(45) Date of Patent: Feb. 13, 2018

(54) LIQUID METAL BEARING

(71) Applicants: Ronald Dittrich, Forchheim (DE); Manfred Fuchs, Nürnberg (DE)

(72) Inventors: Ronald Dittrich, Forchheim (DE); Manfred Fuchs, Nürnberg (DE)

(73) Assignee: Siemens Aktiengesellschaft, München (DE)

(*) Notice: Subject to any disclaimer, the term of this patent is extended or adjusted under 35 U.S.C. 154(b) by 132 days.

(21) Appl. No.: 14/458,027

(22) Filed: Aug. 12, 2014

(65) Prior Publication Data

US 2015/0049861 A1 Feb. 19, 2015

(30) Foreign Application Priority Data

Aug. 13, 2013 (DE) .................. 10 2013 215 977

(51) Int. Cl.
| | | |
|---|---|---|
| *H01J 35/00* | (2006.01) | |
| *F16C 32/06* | (2006.01) | |
| *H01J 35/10* | (2006.01) | |

(52) U.S. Cl.
CPC ........ *F16C 32/0633* (2013.01); *H01J 35/101* (2013.01); *F16C 2223/60* (2013.01); *F16C 2380/16* (2013.01); *H01J 2235/1086* (2013.01)

(58) Field of Classification Search
CPC ..... F16C 32/0633; H01J 35/101; H01J 35/06; H01J 35/16
See application file for complete search history.

(56) References Cited

U.S. PATENT DOCUMENTS

| | | | |
|---|---|---|---|
| 4,856,039 A | | 8/1989 | Roelandse et al. |
| 5,622,435 A | * | 4/1997 | Hiller ............... F16C 33/10 |
| | | | 378/133 |
| 5,624,191 A | * | 4/1997 | Fuchs ................ F16C 33/04 |
| | | | 378/133 |
| 5,955,202 A | | 9/1999 | Steeg et al. |
| 2010/0166149 A1 | | 7/2010 | Okamura |

FOREIGN PATENT DOCUMENTS

| | | |
|---|---|---|
| BE | 19606871 A1 | 8/1997 |
| CN | 1144889 A | 3/1997 |
| CN | 1182471 A | 5/1998 |
| CN | 101681779 A | 3/2010 |
| DE | 3842034 A1 | 6/1990 |
| DE | 19523162 A1 | 1/1996 |
| DE | 19510066 A1 | 5/1996 |
| DE | 19614221 C2 | 5/2000 |

OTHER PUBLICATIONS

Chinese office Action for related Chinese Application No. 201410398777.8 dated May 4, 2016, with English Translation.
German Office Action for German Application No. 10 2013 215 977.3, dated Feb. 17, 2017 with English Translation.
Chinese Office Action for Chinese Patent Application No. 201410398777.8 dated Aug. 10, 2017.

* cited by examiner

*Primary Examiner* — Courtney Thomas
(74) *Attorney, Agent, or Firm* — Lempia Summerfield Katz LLC

(57) ABSTRACT

A liquid metal bearing includes at least one first bearing part and at least one second bearing part that have a non-positive fit connection to one another. At least one first ductile sealing layer is disposed at least partly between at least a first bearing part of the at least one bearing and a second bearing part of the at least one second bearing part.

16 Claims, 3 Drawing Sheets

LIQUID METAL BEARING

This application claims the benefit of DE 10 2013 215 977.3, filed on Aug. 13, 2013, which is hereby incorporated by reference in its entirety.

BACKGROUND

The present embodiments relate to a liquid metal bearing.

A liquid metal bearing is known, for example, from DE 195 23 162 A1.

The known liquid metal bearing includes at least one first bearing part and at least one second bearing part. The at least one first bearing part and the at least one second bearing part have a non-positive fit connection to one another.

With the liquid metal bearing known from DE 195 23 162 A1, an aluminum oxide ($Al_2O_3$) coating or a titanium oxide ($TiO_2$) coating is applied to the surfaces of the bearing parts made of molybdenum by a physical vapor deposition (PVD) process. The coating thicknesses able to be realized by the process lies between approximately 0.1 μm and approximately 1 μm. Even with the maximum possible coating thickness, the rough surface of the bearing parts resulting from machining (e.g., average roughness $R_a$ of approximately 2 μm) may not be completely covered. The rough molybdenum surface may not be planarized by PVD methods.

The aluminum oxide or titanium oxide coatings applied to the surfaces of the bearing parts are relatively hard, so that no "meshing" of surfaces pressed onto one another may be provided. This leads, with increasing stresses being imposed on the liquid metal bearings (e.g., higher rotational speeds, higher temperatures), to increasingly smaller production tolerances (e.g., less than 2 μm) having to be adhered to, so that the applied PVD coatings withstand the increasing pressure of the liquid metal (e.g., prevent the liquid metal escaping).

As a result of the higher evaporation rate during coating (e.g., short process time) and the "granularity" of the evaporation material (e.g., granulate or beads of $Al_2O_3$ with a diameter of approximately 1 mm) during vapor deposition using an electron beam, small "beads" are released from the vapor deposition material, which then remain adhering to the surface of the bearing parts. Even when the two bearing parts are pressed together, no change is visible to such beads. This is because of the actual gap present between the bearing parts (e.g., greater than the diameter of most of the beads) and because of the hardness of the aluminum oxide, so that disadvantageously a larger bearing gap arises than is predetermined by the planarity of the bearing parts.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a liquid metal bearing, in which, even during high stresses, an escape of liquid metal from the bearing is reliably prevented, is provided.

The liquid metal bearing includes at least one first bearing part and at least one second bearing part that have a non-positive fit connection to one another. In one embodiment, at least one first ductile sealing layer is disposed at least partly between a first bearing part and a second bearing part.

The first bearing part and the second bearing part each involve stationary bearing parts, for example, that are connected to one another and enclose a rotating inner bearing that is connected to a shaft that bears an anode plate. In an alternate variant, the first bearing part and the second bearing part rotate together with an anode plate around a stationary inner bearing that is cooled internally. The solution is equally well suited for both variants.

The liquid metal bearing, because at least one first ductile sealing layer is disposed at least partly between the bearing parts, reliably prevents an escape of liquid metal from the liquid metal bearing even with high stresses (e.g., at high pressures and/or high temperatures).

The first ductile sealing layer may be applied, for example, to the first bearing part or to the second bearing part.

Through one or more of the present embodiments, the gap between the bearing parts of the liquid metal bearing that is formed when the bearing is assembled and is the result of the unavoidable production tolerances, is greatly reduced. Under some circumstances, even a greater surface roughness of the bearing parts may be advantageous, because a better "meshing" of the bearing parts with the ductile sealing layer is achieved thereby. In such cases, the manufacturing of a liquid metal bearing is shortened and simplified, since lower production tolerances are provided during the manufacturing of the bearing parts. This results in a corresponding reduction of the manufacturing costs.

In an advantageous form of embodiment of the liquid metal bearing, a second ductile sealing layer is disposed between the first bearing part and the second bearing part. Advantageously, the first ductile sealing layer is applied to the first bearing part, and the second ductile sealing layer is applied to the second bearing part.

An embodiment of the liquid metal bearing is characterized by an intermediate ring being disposed between the first bearing part and the second bearing part. The embodiment is further characterized by a first ductile sealing layer being disposed at least partly between the first bearing part and the intermediate ring and the second ductile sealing layer being disposed at least partly between the sealing ring and the second bearing part. Such a liquid metal bearing is advantageously suitable for even greater long-term stress during operation.

The following materials or a combination of these materials are well suited, because of properties (e.g., ductility) for a ductile sealing layer: Lead, copper, indium, tin, aluminum, gold, silver, graphite, alkali halides. Cesium iodide and cesium bromide are considered as alkali halides, for example.

In an advantageous embodiment, at least one ductile sealing layer is embodied as a film, where the film has a layer thickness of between 50 μm and 2,000 μm. The minimum roughness of 2 μm of the surface of the bearing parts of the liquid metal slide is reliably planarized thereby.

As an alternative or in addition, in accordance with a further advantageous embodiment, at least one ductile sealing layer is embodied as a PVD layer, where the PVD layer, in accordance with an embodiment, has a layer thickness of between 5 μm and 200 μm. In this case too, the minimum roughness of 2 μm of the surface of the bearing parts of the liquid metal bearing is reliably planarized.

The solution of one or more of the present embodiments reliably prevents liquid metal from escaping from the liquid metal bearing even with high stresses (e.g., at high pressures and/or high temperatures). A liquid metal bearing is thus, for example, suitable for an x-ray emitter. The x-ray emitter includes an emitter housing, in which an x-ray tube with a vacuum housing and a drive motor is disposed. A cathode and a rotary anode are disposed in the vacuum housing, and the rotary anode is held in a torsion proof manner on a rotor shaft coupled to the drive motor. The rotor shaft is supported by at least one liquid metal bearing. The first bearing part of the liquid metal bearing, for example, is the bearing part close to the plate, while the second bearing part is the bearing part remote from the plate.

BRIEF DESCRIPTION OF THE DRAWINGS

Ten diagrams of exemplary embodiments of a liquid metal bearing are explained in greater detail below based on the drawings, without being restricted thereto. Each of the figures shows a longitudinal section in an area of bearing parts.

DETAILED DESCRIPTION

One embodiment of a liquid metal bearing includes at least one first bearing part 1 and at least one second bearing part 2. The at least one first bearing part 1 and the at least one second bearing part 2 have a non-positive fit connection to one another. In accordance with one embodiment, at least one first ductile sealing layer 11a or 11b is disposed at least partly, at least between a first bearing part 1 of the at least one first bearing part 1 and a second bearing part 2 of the at least one second bearing part 2.

Figure 1:
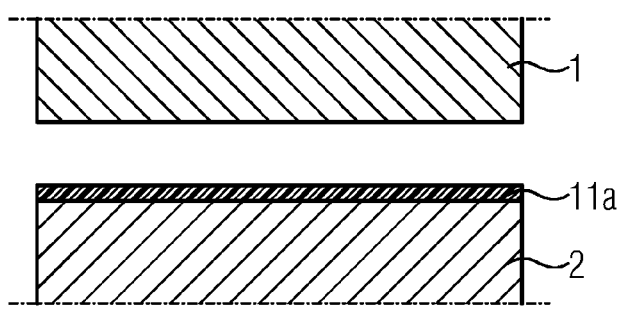
FIG. 1 shows a first embodiment of a liquid metal bearing.
Figure 2:
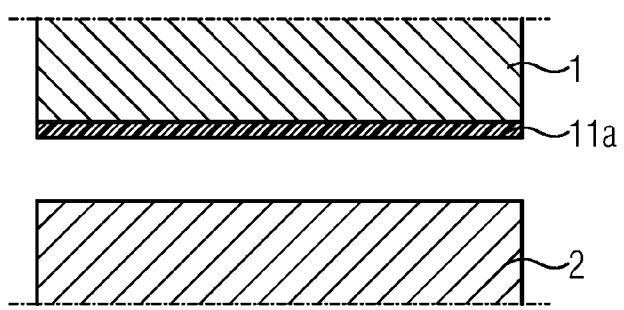
FIG. 2 shows a second embodiment of a liquid metal bearing.
Figure 3:
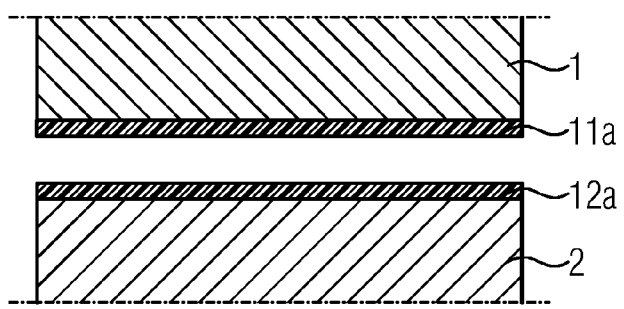
FIG. 3 shows a third embodiment of a liquid metal bearing.
Figure 4:
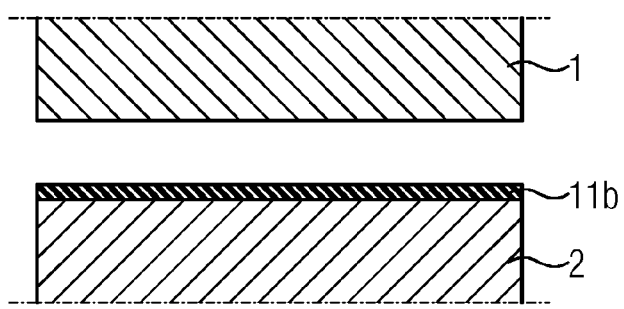
FIG. 4 shows a fourth embodiment of a liquid metal bearing.
Figure 5:
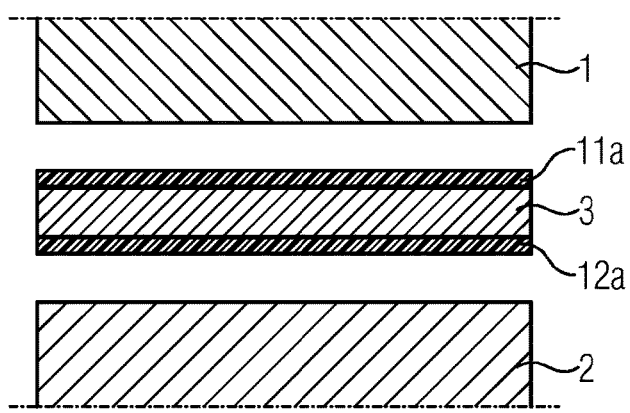
FIG. 5 shows a fifth embodiment of a liquid metal bearing.
Figure 6:
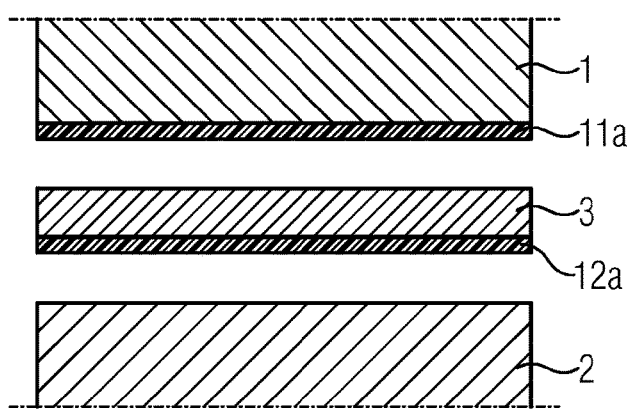
FIG. 6 shows a sixth embodiment of a liquid metal bearing.
Figure 7:
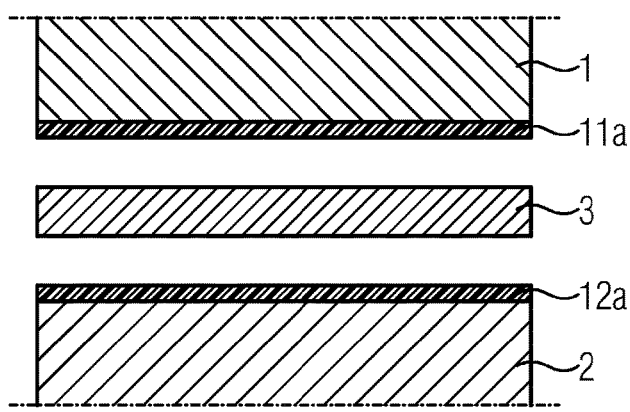
FIG. 7 shows a seventh embodiment of a liquid metal bearing.
Figure 8:
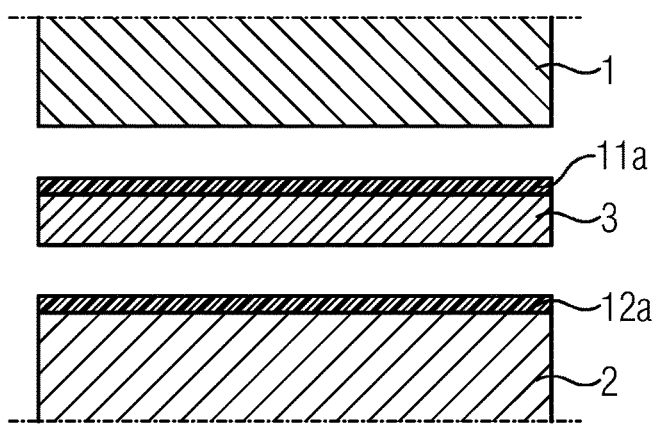
FIG. 8 shows an eighth embodiment of a liquid metal bearing.
Figure 9:
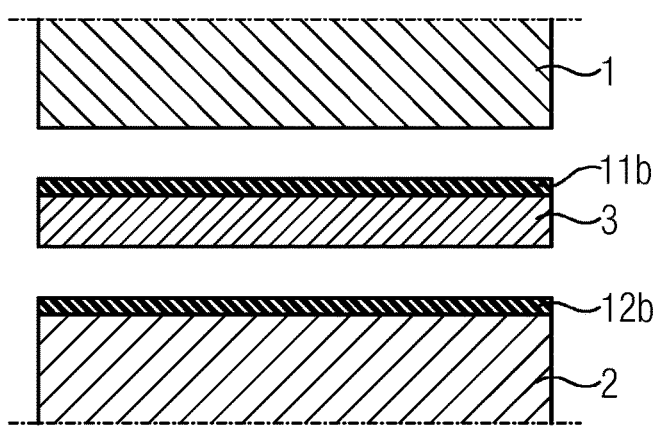
FIG. 9 shows a ninth embodiment of a liquid metal bearing.
Figure 10:
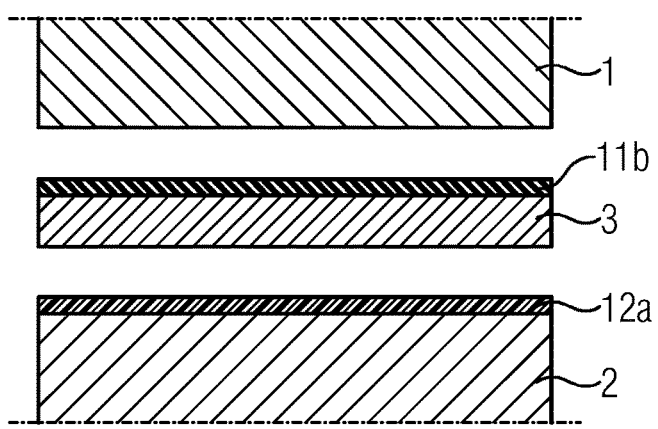
FIG. 10 shows a tenth embodiment of a liquid metal bearing.

With reference to the exemplary embodiment depicted in FIGS. 1 to 10, for reasons of clarity, only one liquid metal bearing including a first bearing part 1 and a second bearing part 2 is shown in each case. The first bearing part 1 and the second bearing part 2 have a non-positive fit connection to one another.

In FIGS. 1 to 4, a "two-part" sealing surface solution is shown, while in FIGS. 5 to 10, a "three-part" sealing surface solution is presented in each case.

The two-part sealing surface solution (FIGS. 1 to 4) includes a first bearing part 1 and a second bearing part 2 that are both connected to one another directly in a non-positive fit. The exemplary embodiments shown in FIGS. 1, 2 and 4 each only have one first ductile sealing layer 11a or 11b, and the embodiment according to FIG. 3 has a second ductile sealing layer 12a in addition to the first ductile sealing layer 11a.

The three-part sealing surface solution (FIGS. 5 to 10) again includes a first bearing part 1 and a second bearing part 2. An intermediate ring 3 is disposed between the first bearing part 1 and the second bearing part 2. At least one first ductile sealing layer 11a or 11b is disposed at least partly between the first bearing part 1 and the intermediate ring 3. At least one second ductile sealing layer 12a or 12b is disposed at least partly between the sealing ring 3 and the second bearing part 2. With the three-part sealing surface solution, the first bearing part 1 and the second bearing part 2, with the intermediate ring 3, have a non-positive fit connection to one another.

In the first form of embodiment (FIG. 1), a first ductile sealing layer 11a is disposed between the first bearing part 1 and the second bearing part 2. The first ductile sealing layer 11a is embodied as a PVD layer and is applied to the second bearing part 2.

In the second exemplary embodiment (FIG. 2), a first ductile sealing layer 11a is again disposed between the first bearing part 1 and the second bearing part 2. The first ductile sealing layer 11a is however applied to the first bearing part 1 and is embodied as a PVD layer.

In the third embodiment (FIG. 3), a first ductile sealing layer 11a and the second ductile sealing layer 12a are disposed between the first bearing part 1 and the second bearing part 2. The first ductile sealing layer 11a is disposed on the first bearing part 11. The second ductile sealing layer 12a is disposed on the second bearing part 2. Both ductile sealing layers 11a and 12a are embodied as PVD layers.

In the fourth form of embodiment (FIG. 4), a first ductile sealing layer 11b is disposed between the first bearing part 1 and the second bearing part 2. The first ductile sealing layer 11b is embodied as a film and is applied to the second bearing part 2.

The fifth embodiment (FIG. 5) includes an intermediate ring 3 that is disposed between the first bearing part 1 and the second bearing part 2. A first ductile sealing layer 11a is disposed between the first bearing part 1 and the intermediate ring 3, and a second ductile sealing layer 12a is disposed between the intermediate ring 3 and the second bearing part 2. Both ductile sealing layers 11a and 12b are embodied as PVD layers and/or applied to both sides of the intermediate ring 3.

The sixth exemplary embodiment (FIG. 6) also includes an intermediate ring 3 that is disposed between the first bearing part 1 and the second bearing part 2. A first ductile sealing layer 11a is disposed between the first bearing part 1 and the intermediate ring 3, and a second ductile sealing layer 12a is disposed between the intermediate ring 3 and the second bearing part 2. Both ductile sealing layers 11a and 12a are embodied as PVD layers. The first ductile sealing layer 11a is applied to the first bearing part 1, and the second ductile sealing layer 12a is disposed on a side of the intermediate ring 3 facing towards the second bearing part 2.

The seventh form of embodiment (FIG. 7) includes an intermediate ring 3 that is disposed between the first bearing part 1 and the second bearing part 2. A first ductile sealing layer 11a is disposed between the first bearing part 1 and the intermediate ring 3, and a second ductile sealing layer 12a is disposed between the intermediate ring 3 and the second bearing part 2. Both ductile sealing layers 11a and 12a are embodied as PVD layers. The first ductile sealing layer 11a is applied to the first bearing part 1, and the second ductile sealing layer 12a is applied to the second bearing part 2.

The eighth form of embodiment (FIG. 8) also includes an intermediate ring 3 that is disposed between the first bearing part 1 and the second bearing part 2. A first ductile sealing layer 11a is disposed between the first bearing part 1 and the intermediate ring 3, and a second ductile sealing layer 12a is disposed between the intermediate ring 3 and the second bearing part 2. Both ductile sealing layers 11a and 12a are embodied as PVD layers, where the first ductile sealing layer 11a is disposed on a side of the intermediate ring 3 facing towards the first bearing part 1, and the second ductile sealing layer 12*a* is applied to the second bearing part 2.

The ninth exemplary embodiment (FIG. 9) also includes an intermediate ring 3 that is disposed between the first bearing part 1 and the second bearing part 2. A first ductile sealing layer 11*b* is disposed between the first bearing part 1 and the intermediate ring 3, and a second ductile sealing layer 12*b* is disposed between the intermediate ring 3 and the second bearing part 2. Both ductile sealing layers 11*b* and 12*b* are embodied as ductile films, where the first ductile sealing layer 11*b* is disposed on the intermediate ring 3. The second ductile sealing layer 12*b* is disposed on the second bearing part 2.

The 10th embodiment (FIG. 10) also includes an intermediate ring 3 that is disposed between the first bearing part 1 and the second bearing part 2. A first ductile sealing layer 11*b* is disposed between the first bearing part 1 and the intermediate ring 3, and a second ductile sealing layer 12*a* is disposed between the intermediate ring 3 and the second bearing part 2. The first ductile sealing layer 11*b* is embodied as a film, while the second ductile sealing layer 12*a* is embodied as a PVD layer. The first ductile sealing layer 11*b* is disposed on the side of the sealing ring 3 that faces towards the first bearing part 1. The second ductile sealing layer 12*a* is applied to the second bearing part 2.

Although the invention has been illustrated and described in greater detail by exemplary embodiments, the invention is not restricted by the exemplary embodiments shown in FIGS. 1 to 10. Instead, other variants may be derived therefrom by the person skilled in the art, without departing from the underlying invention.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A liquid metal bearing comprising:
   at least one first bearing part;
   at least one second bearing part, wherein the at least one first bearing part and the at least one second bearing part have a non-positive fit connection to one another;
   at least one first ductile sealing layer that is disposed at least partly between a first bearing part of the at least one first bearing part and a second bearing part of the at least one second bearing part; and
   an intermediate ring that is disposed between the first bearing part and the second bearing part, the intermediate ring comprising:
     a first surface that faces the first bearing part; and
     a second surface opposite the first surface, the second surface facing the second bearing part, wherein the first surface is spaced at a distance from the first bearing part and the second surface is spaced at a distance from the second bearing part,
   wherein:
     a ductile sealing layer of the at least one first ductile sealing layer is disposed on the first bearing part, the second bearing part, or the first bearing part and the second bearing part, respectively, an outermost surface of the respective ductile sealing layer facing and being at a distance from the intermediate ring;
     another ductile sealing layer of the at least one first ductile sealing layer is disposed on the first surface of the intermediate ring, the second surface of the intermediate ring, or the first surface of the intermediate ring and the second surface of the intermediate ring, respectively, an outermost surface of the respective other ductile sealing layer facing and being at a distance from the first bearing part, the second bearing part, or the first bearing part and the second bearing part, respectively; or
     a combination thereof.

2. The liquid metal bearing of claim 1, further comprising a second ductile sealing layer that is disposed between the first bearing part and the second bearing part.

3. The liquid metal bearing of claim 2,
   wherein the at least one first ductile sealing layer is disposed at least partly between the first bearing part and the first surface of the intermediate ring, and the second ductile sealing layer is disposed at least partly between the second surface of the intermediate ring and the second bearing part.

4. The liquid metal bearing of claim 1, wherein the at least one first ductile sealing layer is made of lead, copper, indium, tin, aluminum, gold, silver, graphite, alkali halides, or a combination thereof.

5. The liquid metal bearing of claim 2, wherein at least one ductile sealing layer of the at least one first ductile sealing layer and the second ductile sealing layer is configured as a film.

6. The liquid metal bearing of claim 2, wherein at least one ductile sealing layer of the at least one first ductile sealing layer and the second ductile sealing layer is configured as a PVD layer.

7. The liquid metal bearing of claim 5, wherein the film has a layer thickness of between 50 μm and 2,000 μm.

8. The liquid metal bearing of claim 6, wherein the PVD layer has a layer thickness of between 5 μm and 200 μm.

9. An x-ray emitter comprising:
   an emitter housing;
   an x-ray tube comprising a vacuum housing and a drive motor, the x-ray tube being disposed in the emitter housing;
   a cathode and a rotary anode disposed in the vacuum housing, wherein the rotary anode is held in a torsion-proof manner on a rotor shaft coupled to the drive motor, and
   wherein the rotor shaft is supported rotatably by at least one liquid metal bearing, the at least one liquid metal bearing comprising:
     at least one first bearing part;
     at least one second bearing part, wherein the at least one first bearing part and the at least one second bearing part have a non-positive fit connection to one another;
     at least one first ductile sealing layer that is disposed at least partly between a first bearing part of the at least one first bearing part and a second bearing part of the at least one second bearing part; and an intermediate ring that is disposed between the first bearing part and the second bearing part, the intermediate ring comprising:

a first surface that faces the first bearing part; and a second surface opposite the first surface, the second surface facing the second bearing part, wherein the first surface is spaced at a distance from the first bearing part and the second surface is spaced at a distance from the second bearing part, wherein:

a ductile sealing layer of the at least one first ductile sealing layer is disposed on the first bearing part, the second bearing part, or the first bearing part and the second bearing part, respectively, an outermost surface of the respective ductile sealing layer facing and being at a distance from the intermediate ring;

another ductile sealing layer of the at least one first ductile sealing layer is disposed on the first surface of the intermediate ring, the second surface of the intermediate ring, or the first surface of the intermediate ring and the second surface of the intermediate ring, respectively, an outermost surface of the respective other ductile sealing layer facing and being at a distance from the first bearing part, the second bearing part, or the first bearing part and the second bearing part, respectively; or a combination thereof.

10. The x-ray emitter of claim 9, wherein the at least one liquid metal bearing further comprises a second ductile sealing layer that is disposed between the first bearing part and the second bearing part.

11. The x-ray emitter of claim 10, wherein the at least one first ductile sealing layer is disposed at least partly between the first bearing part and the first surface of the intermediate ring, and the second ductile sealing layer is disposed at least partly between the second surface of the intermediate ring and the second bearing part.

12. The x-ray emitter of claim 9, wherein the at least one first ductile sealing layer is made of lead, copper, indium, tin, aluminum, gold, silver, graphite, alkali halides, or a combination thereof.

13. The x-ray emitter of claim 10, wherein at least one ductile sealing layer of the at least one first ductile sealing layer and the second ductile sealing layer is configured as a film.

14. The x-ray emitter of claim 10, wherein at least one ductile sealing layer of the at least one first ductile sealing layer and the second ductile sealing layer is configured as a PVD layer.

15. The x-ray emitter of claim 13, wherein the film has a layer thickness of between 50 μm and 2,000 μm.

16. The x-ray emitter of claim 14, wherein the PVD layer has a layer thickness of between 5 μm and 200 μm.

* * * * *